United States Patent [19]

Nichols

[11] 4,375,281
[45] Mar. 1, 1983

[54] AIRCRAFT CANOPY LOCK

[75] Inventor: George H. Nichols, Quartz Hill, Calif.

[73] Assignee: The United States of America as represented by the Administrator of the National Aeronautics and Space Administration, Washington, D.C.

[21] Appl. No.: 248,744

[22] Filed: Mar. 30, 1981

[51] Int. Cl.³ .............................................. B64C 1/14
[52] U.S. Cl. .................................. 244/121; 244/129.4; 292/254
[58] Field of Search .................. 244/121, 129.1, 129.4; 74/527, 528; 292/26, 48, 52, 106, 254

[56] References Cited

U.S. PATENT DOCUMENTS

| 2,444,114 | 6/1948 | Pevney | 244/121 |
| 2,627,433 | 2/1953 | Wolfe | 292/106 |
| 3,194,517 | 7/1965 | Morris et al. | 244/121 |
| 3,287,052 | 11/1966 | Wartian | 292/254 |

FOREIGN PATENT DOCUMENTS 699065 10/1940 Fed. Rep. of Germany ...... 244/121
565632 11/1944 United Kingdom ................ 244/121

Primary Examiner—Charles E. Frankfort
Attorney, Agent, or Firm—John R. Manning; Paul F. McCaul

[57] ABSTRACT

A manually-operable lock for releasably securing a canopy 10 in closed condition characterized by a pair of dogs 28 mounted in fore-and-aft alignment on the wall of the cockpit of an aircraft, a pair of dog receivers 16 mounted on the canopy in juxtaposition with the dogs when the canopy is in its closed condition, a dog-actuating arm 32 including internal and external arm components 34 and 36, respectively, supported for oscillation about a common axis and pivotally connected to the dogs through a pitman rod 30 for pivotally displacing the dog, a spring-loaded pin 50 mounted on the arm and adapted to be ramp-cammed and positioned in coaxial alignment with a receiving bore 52, when the arm is at the limit of its forward throw, and pin-release means including external and internal components 66 and 60, respectively, for releasing the arm for pivotal displacement.

1 Claim, 5 Drawing Figures

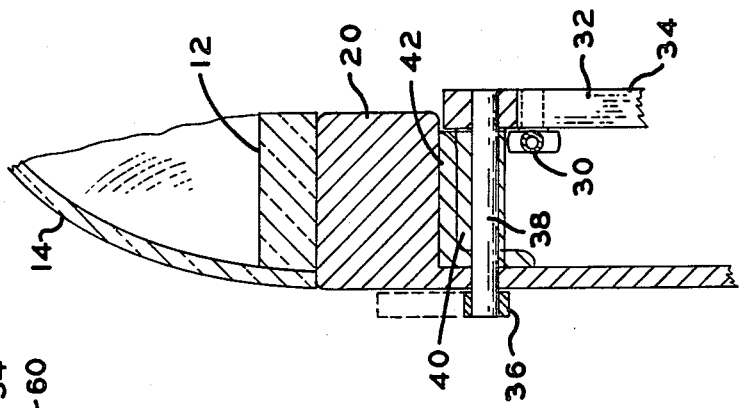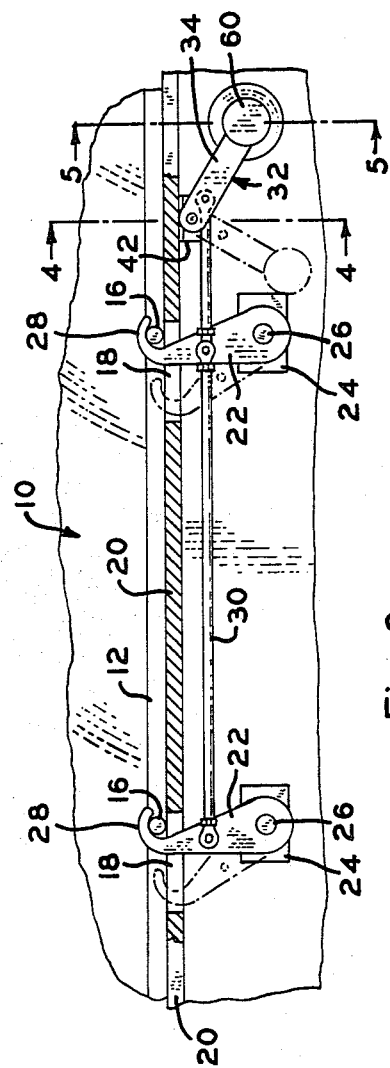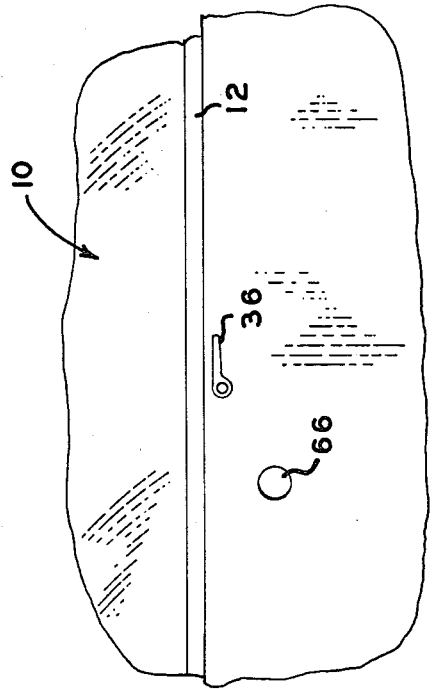

AIRCRAFT CANOPY LOCK

ORIGIN OF THE INVENTION

The invention described herein was made in the performance of work by an employee of the United States Government and may be manufactured and used by or for the government for governmental purposes without the payment of any royalties thereon or therefor.

BACKGROUND OF THE INVENTION

1. Field of the Invention

The invention generally relates to locking mechanisms for the canopies of aircraft, and more particularly to an improved, economic, and simplified lock for the so-called "clamshell" canopy which provides for a positive locking of the canopy, while yet being readily operable from both inside and outside the cockpit in order to release the canopy for opening displacement, even under emergency conditions.

2. Description of the Prior Art

As can be fully appreciated by those familiar with the aircraft industry, particularly aircraft equipped with pivotal canopies, there appears to be a myriad of locking devices available for securing such canopies in place. As is also appreciated, however, by those familiar with the aircraft industry, efforts are continuously being made to simplify canopy locks for thus reducing weight and complexity, without subjecting pilots to numerous hazardous conditions which may result from oversimplification. For example, where a manually operable handle is employed, for controlling a canopy lock, it is necessary that access to the handle be afforded from outside the aircraft as well as from inside the cockpit, where unimpeded emergency rescue operations can be conducted.

Additionally, any handle for a release mechanism located within the cockpit must be capable of affording a positive locking operation which normally cannot be interrupted through inadvertent, or accidental engagement of a pilot's hand, arm, shoulder, knee, or the like, particularly while the aircraft is in flight.

As a consequence of the various requirements for increased simplicity and reliability, as well as the presence of an overriding interest in production and maintenance costs imposed on designers of aircraft and locking mechanisms commonly provided for aircraft canopies, there is a continuing need to provide improved locks.

During the course of a preliminary search conducted on the instant invention, the patents listed on the enclosed Form PTO-1449 were discovered.

While the concept of employing a detent lock adapted to be actuated from one side of a door, or the like, by a push-button, as well as the concept of employing a detent lock adapted to be actuated from the same side of a door by a pull-pin, generally is not new, it is believed that none of the references discovered during the course of the search suggest a canopy lock for a clamshell canopy, such as the lock hereinafter more specifically described and claimed.

For example, the patent to McCaffrey U.S. Pat. No. 311,134 discloses a door retainer having a mechanism similar to that of a push-button and a detent in which a button, exterior to the door, is employed to drive a spring-loaded bolt out of engagement with a recess. However, there is no provision for actuating the bolt from within the door.

The patent to Griswold, Jr. U.S. Pat. No. 3,171,644 discloses a pull-button for pulling a detent pin from a ramp-shaped recess. The button and detent are mounted in the distal end of an automobile window crank; however there is neither an interior window crank nor an interior device for actuating the detent pin.

The remaining references were selected on the basis of a general representation of the state of the art.

It is therefore the general purpose of the instant invention to provide an improved canopy lock which is simple and economic to fabricate, install, operate and maintain, and yet being capable of providing a positive-locking function for a clamshell canopy.

OBJECTS AND SUMMARY OF THE INVENTION

It is an object of the instant invention to provide a safe and improved canopy lock for an aircraft canopy.

It is another object to provide a practical, economic and reliable canopy lock having positive locking capabilities.

It is another object to provide a simple, economic, and reliable canopy lock for a clamshell canopy adapted to be manually actuated from both inside and outside the cockpit for an aircraft equipped with the canopy.

These and other objects and advantages are achieved through the use of a canopy lock which includes a pair of dogs mounted on the wall of a cockpit adjacent a canopy, when the canopy is in its closed condition relative to the cockpit, and a handle including both internal and external components mounted for oscillation and adapted to be secured in place for securing the dogs against displacement relative to locking pins mounted on the canopy through a spring-loaded pin-and-detent retainer; access to said retainer being afforded from both within and without the cockpit, as will become more readily apparent by reference to the following description and claims in light of the accompanying drawings.

DESCRIPTION OF THE DRAWINGS

FIG. 2 is a fragmented view of the canopy lock embodying the principles of the instant invention, taken from within the cockpit of the aircraft shown in FIG. 1.

FIG. 3 is a fragmented, external view of the cockpit shown in FIG. 1, on somewhat of an enlarged scale.

FIG. 4 is a fragmented, vertically sectioned view taken generally along lines 4—4 of FIG. 2.

DESCRIPTION OF THE PREFERRED EMBODIMENT

Figure 1:
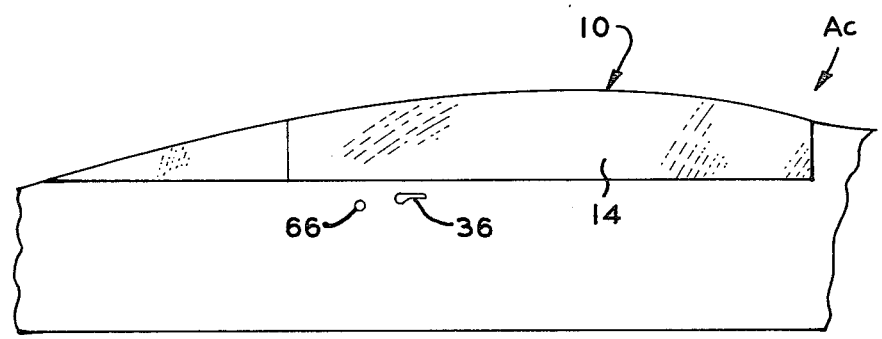
FIG. 1 is a fragmented, external view of an aircraft cockpit having a clamshell canopy equipped with a canopy lock embodying the principles of the invention.

Referring now to the drawings, with more particularity, wherein like reference characters designate like or corresponding parts throughout the several views, there is shown in FIG. 1 an aircraft cockpit, generally designated $A_C$ having a canopy, generally designated 10, of the so-called clamshell variety.

While not shown, it is to be understood that the canopy 10 is adapted to be oscillated about a longitudinal axis generally paralleling the longitudinal axis of the aircraft, between opened and closed positions relative to the cockpit. Since the details of the canopy 10 form no part of the invention hereinafter claimed, a detailed description thereof is omitted in the interest of brevity. It suffices to understand that as shown, the canopy 10 is adapted to be pivoted upwardly and away from the pilot, in order to open the cockpit and downwardly and toward the pilot in order to close the cockpit. Further, as best shown in FIG. 2, the canopy 10 generally includes a bottom frame member, or rail 12, to which is attached a transparent portion or bubble 14, FIG. 4. It will be appreciated that the rail 12 is shown on a scale not to proportion for illustrative purposes.

Projected laterally from the rail 12 is a pair of pins or dog receivers 16 which, as a practical matter, comprise protuberances having rounded upper surfaces rigidly affixed to the rail 12 as by bolting, welding or the like, FIG. 2. It is noted that the dog receivers 16 are longitudinally spaced to positions adjacent mutually spaced, slotted openings 18 formed in a bed rail 20 projected along the side of the cockpit in a position to receive the rail 12 of the canopy 10 in a mated relationship when the canopy is closed.

Extended vertically through each of the slotted openings 18 is a pivotal dog 22. In practice, each of the dogs 22 is pivotally mounted on a suitable plate 24 affixed to the side of the aircraft, preferably within the cockpit. Suitable pivot pins 26 mounted on the plates are provided for supporting the dogs 22 for oscillation in fore and aft directions.

Each of the dogs 22, in turn, includes a hook or lip 28 which is of an arcuate configuration adapted to engage a receiver 16 and draw the rail 12 downwardly, as pivotal motion in a forward direction is imparted to the dog 22 and the canopy 10 is in its closed condition. Similarly, the lip 28, for each of the dogs, serves to release a receiver 16 when the dog associated therewith is pivoted rearwardly within the slotted opening 18.

In order to impart simultaneous pivotal motion to the dogs 22, the dogs are interconnected through a pitman rod 30 which serves as a link therebetween. As best shown in FIG. 2, the rod 30 projects forwardly of the leading dog 22 to be pivotally connected to a handle, herein referred to as a dog-actuating arm, generally designated 32. The dog-actuating arm 32, as shown, includes a first arm component 34 located internally of the cockpit, hereinafter referred to as an internal arm, and a second arm component 36 located externally of the cockpit, hereinafter referred to as an external arm component.

The arm components 34 and 36 are rigidly mounted at the opposite ends of a coupling pin 38 which is, in turn, received in a tubular bearing 40 supported by a bracket 42 suspended from beneath the bed rail 20, as best shown in FIG. 4.

As a practical matter, the bracket 42 is affixed to the bed rail 20 in any suitable fashion, as by bonding or the like. However, it is to be understood that the coupling pin 38 serves to unite the internal and external arm components, 34 and 36 respectively, into a fully integrated configuration. Hence, pivotal displacement of either of the arm components 34 or 36 necessarily imparts pivotal displacement to the other arm component. Pivotal displacement of the dog-actuating arm 32 is, in turn, transmitted to the dog 22, via the pitman rod 30, connected to the component 34. Consequently, a pivotal displacement of the dog-actuating arm 32 in a rearward direction imparts rearward pivotal displacement to the dogs 22 for thus causing the dogs simultaneously to release the dog-receivers 16. Conversely, pivotal displacement of the dog-actuating arm 32 in a forward direction serves to impart forward pivotal displacement to the dogs 22 for causing the lips 28 of the dogs to engage the receivers 16 and thus to draw the rail 12 of the canopy 10 into abutted, sealed engagement with the bed rail 20.

Figure 5:
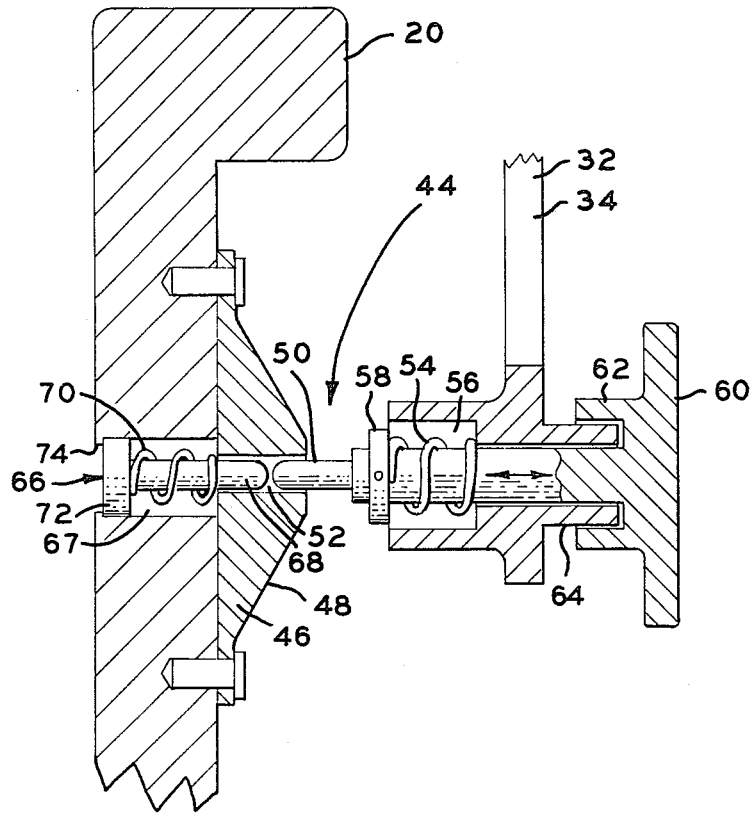
FIG. 5 is a fragmented, vertically sectioned view, on somewhat of an enlarged scale, taken generally along lines 5—5 of FIG. 2.

In order to effect a positive locking of the dogs 22, the dog-actuating arm 32 is provided with a spring-biased latching device 44, as best shown in FIG. 5. The spring-biased latching device includes a circular base member 46 adapted to be secured to the wall of the cockpit, through suitable fasteners such as screws, or the like, not designated.

It is noted that the base member 46 includes a conical center surface 48. This surface is of a truncated, conical configuration which, in practice, functions as a camming ramp for depressing a spring-loaded pull-pin 50, mounted on the arm component 34. Additionally, the base member 46 is provided with an axial bore 52 configured to receive the distal end portion of the pull-pin 50 for thus latching the arm 32 against pivotal displacement.

The pull-pin 50 is spring biased through the use of a compression spring 54 concentrically related thereto, seated in a well 56 defined adjacent the extended end of the arm component 34 and secured in place by a collar 58. This collar is affixed to the pull-pin 50 and maintains the spring 54 in a continuously compressed state. Thus the pull-pin 50 is continuously urged by the spring 54 in a direction suitable for effecting a mating of the pull-pin with the bore 52 of the base member 46.

It also is to be noted that affixed to the end of the pull-pin 50, opposite the distal end portion thereof, there is provided a pull-knob 60 having a cylindrical guide 62 telescopically related to a cylindrical riser 64 projected from the arm component 34. Hence, in order to release the arm 32 for pivotal displacement, from within the cockpit, a pilot simply grasps the pull-knob 60 and applies thereto an adequate axial force for causing the spring 54 to collapse for thus causing the pull-pin 50 to retract relative to the arm 32. Thus the pin 50 is extracted from the bore 52.

However, it is also important to note that in order to release the pull-pin 50 from a mated relation with the bore 52, from a position externally related to the cockpit, there is provided an ejection pin 66, seated in a bore 67, having a distal end portion 68 projected axially into the bore 52. The ejection pin 66 also is spring-loaded in a retracted direction, relative to the pull-pin 50, by a compression spring 70. The ejection pin 66 preferably includes a head 72 supported against expulsion from the bore 67 by an annular lip 74. It should now be apparent that in order to release the arm 32 for pivotal displacement, from a position externally related to the cockpit, the ejection pin 66 is manually depressed for thus causing the distal end portion 68 of the pin 66 to engage the distal end portion of the pull-pin 50 in order to force the pin 50 from its mated relation with the bore 52, against the applied forces of the spring 54. Thus the arm 32 is released for pivotal displacement. Of course, once the arm 32 is released for pivotal displacement, pivotal motion is imparted to the arm through a simple manipulation of the external arm component 36 for thus imparting simultaneous pivotal motion to the dogs 22.

OPERATION

It is believed that in view of the foregoing description, the operation of the invention herein disclosed and claimed readily is apparent. However, in the interest of completeness, the operation of the herein disclosed invention is, at this point, briefly reviewed.

Assuming that the canopy 10 is in its closed condition, relative to the cockpit, with the dogs 22 in an engaged relation with the dog-receivers 16, it is a simple matter to release the canopy from without or from within the cockpit.

For example, in order to release the canopy for pivotal displacement from without the cockpit, it is simply necessary to depress the head 72 of the ejection pin 66 for thus causing the distal end portion 68 of the ejection pin to engage and force the distal end of the pull-pin 50 from mated relation with the bore 52. The arm 32 is thus released for pivotal displacement so that upon being pivotally displaced rearwardly, simultaneous rearward motion is imparted to the dogs 22, via the pitman rod 30, for thus causing the lips 28 of the dogs to be retracted relative to the dog-receivers 16. Thus the canopy is released for opening displacement.

Similarly, in order to release the canopy from within the cockpit, it is a simple matter to grasp the pull-knob 60 and apply sufficient tension to the pull-pin 50 for thereby causing the pull-pin to be retracted from the bore 52, against the applied forces of the spring 54. Thus, the arm 32 is again released for pivotal displacement in order to facilitate pivotal motion of the arm in order to retract the dogs 22 relative to the dog-receivers 16, as before described.

In order to secure the canopy 10 in a closed condition, once the canopy has been pivotally displaced for causing the rail 12 to seat on the bed rail 20 with the dogs 22 disposed in retracted positions relative to the dog-receivers 16, the arm 32 is pivotally advanced in a forward direction, from within or without the cockpit, for thereby transmitting forward pivotal motion through the pitman rod 30 to the dogs 22, causing the lips 28 thereof to engage the dog-receivers 16. In order to effect a positive latching of the device 44, the distal end portion of the pull-pin 50 is cammed or caused to ride-up the conical surface 48, as continued pivotal motion is imparted to the arm. Of course, continued advancement of the distal end portion of the pull-pin 50 along the surface 48 continuously compresses the spring 54 until such time as the distal end portion 50 of the pull-pin becomes axially aligned with the bore 52, at this instant, the component 34 is at the limit of its forward throw and becomes effective for driving the pin to mated relation with the bore 52 for thus locking the arm 32 against pivotal displacement.

In view of the foregoing, it is believed to be readily apparent that the lock embodying the principles of the instant invention comprises an improved, efficient and practical lock which satisfies many of the needs now existing in the aircraft industry.

What is claimed is:

1. A simplified, manually-operable lock for releasably securing a canopy in a closed condition relative to an aircraft cockpit, comprising:

a plurality of dogs each pivotally mounted on the wall of said cockpit, a pin mounted on said canopy and disposed in juxtaposed relation with each dog when said canopy is in closed condition relative to said cockpit, each dog having an arcuate hook adapted to engage with its corresponding pin when said canopy is in said closed condition;

means for rotating said hooks of said dogs into and out of secured relation with said pins including a coupling pin rotatably mounted within said cockpit wall with the two extremities of said pin extending beyond said wall, an internal arm fastened to the pin extremity within said cockpit and an external arm fastened to the other pin extremity, and a pitman directly fastened to said dogs and said internal arm whereby manual rotation of either the internal arm or the external arm in a first direction causes the dogs and pins to engage and arm rotation in the opposite direction causes the dogs and pins to disengage;

latching means for releasably securing said internal and external arms against oscillation including a spring-loaded release pin mounted on said internal arm, said spring-loaded release pin having first and seconds ends, a pin receiver mounted on the inner cockpit wall adjacent to said internal arm and adapted to receive the first end of said release pin, said pin receiver having an annular pin ramp with a truncated conical configuration and a bore extending axially therethrough for receiving said first end of said release pin, a pull-knob secured to said second end of said spring-loaded release pin for enabling the release of said pin from said bore of said receiver, a spring-biased ejection pin disposed in said cockpit wall in coaxial alignment with said receiver bore, said ejection pin having first and seconds ends, a push-button fastened to said first end of said ejection pin and said push-button being accessible from the exterior wall of said cockpit, said second end of said ejection pin situated in said receiver bore and said pin being able to translate in said bore when said push-button is manually depressed whereby said release pin may be ejected from said receiver bore when said push-button is depressed.

* * * * *